(12) United States Patent
Nolan-Brown

(10) Patent No.: US 6,779,900 B1
(45) Date of Patent: Aug. 24, 2004

(54) TETHER ATTACHED BACK SEAT SAFETY MIRROR

(75) Inventor: Patricia Nolan-Brown, Wakefield, MA (US)

(73) Assignee: Blue Ridge International Products Company, Freeport, FL (US)

( * ) Notice: Subject to any disclaimer, the term of this patent is extended or adjusted under 35 U.S.C. 154(b) by 0 days.

(21) Appl. No.: 10/397,501

(22) Filed: Mar. 26, 2003

Related U.S. Application Data

(60) Provisional application No. 60/367,685, filed on Mar. 27, 2002.

(51) Int. Cl.[7] .................................................. G02B 7/18
(52) U.S. Cl. ........................ 359/871; 359/857; 359/872; 248/489; 248/497; 297/185; 297/188.06
(58) Field of Search ............................ 297/185, 188.06; 359/871, 857, 876, 872; 248/489, 490, 493, 497, 494

(56) References Cited

U.S. PATENT DOCUMENTS

| | | | | |
|---|---|---|---|---|
| 3,273,891 A | | 9/1966 | Grim, Jr. ..................... | 273/163 |
| 4,624,539 A | | 11/1986 | King et al. .................. | 350/632 |
| 4,702,572 A | * | 10/1987 | Cossey ........................ | 359/876 |
| 4,712,892 A | * | 12/1987 | Masucci ...................... | 297/185 |
| 4,733,956 A | | 3/1988 | Erickson ..................... | 350/624 |
| 4,902,118 A | * | 2/1990 | Harris ......................... | 359/871 |
| 4,909,618 A | | 3/1990 | Gardner ...................... | 350/623 |
| 5,103,347 A | * | 4/1992 | Lumbra et al. .............. | 359/871 |
| 5,285,321 A | * | 2/1994 | Nolan-Brown .............. | 359/857 |
| 5,576,898 A | | 11/1996 | Rubin ......................... | 359/841 |
| 5,668,526 A | * | 9/1997 | Collins ....................... | 359/871 |
| 6,039,455 A | | 3/2000 | Sorenson .................... | 362/142 |
| 6,120,155 A | * | 9/2000 | Brennan et al. ............. | 359/857 |
| 6,305,810 B1 | | 10/2001 | Mercado ..................... | 359/872 |
| 6,354,708 B1 | | 3/2002 | Monahan et al. ........... | 359/871 |
| 6,485,154 B1 | | 11/2002 | Nolan-Brown .............. | 359/872 |
| 6,491,403 B2 | * | 12/2002 | Edgar ......................... | 297/185 |
| 2003/0039041 A1 | | 2/2003 | Darling et al. | |

OTHER PUBLICATIONS

"BearView Infant Mirror," Copyright See Me Smile Products, Inc. 2001–02, Bear View Copyright 1999, http://www.bearview.net/index~ns4.html and http://www.bearview.net/additionaluses2~ns4.html.

"CarSeat Mirror," NK Enterprises, http://www.carseatmirror.com/ and http://www.carseatmirror.com/features.php and http://www.carseatmirror.com/contactus.php.

* cited by examiner

*Primary Examiner*—Peter R. Brown

(57) ABSTRACT

A device is described for observing an infant in a rear facing safety seat located in the rear seat of a motor vehicle. A rear seat mirror has a front reflecting surface and a back surface. A mirror positioning structure is connected to the back surface by a v-shaped arrangement of support surfaces. A mirror attachment assembly includes at least one strap having a secured end connected to at least one of the back surface and the mirror positioning structure, and a free end having a fastener capable of connecting to a tether anchor associated with the rear seat.

18 Claims, 6 Drawing Sheets

TETHER ATTACHED BACK SEAT SAFETY MIRROR

This application claims the benefit of Provisional application Ser. No. 60/367,685 filled Mar. 27, 2002.

FIELD OF THE INVENTION

The invention relates to a mirror for observing an infant in a rearward-facing child safety seat located in the back seat, the mirror being adapted for attachment to at least one tether fastener associated with the back seat

BACKGROUND ART

Children below a certain age traveling in a vehicle are required to be secured in a child safety seat that is itself fastened to the center of a back seat of the vehicle. It has become common practice, as a result of the recommendations of child safety advocates, to position a child car safety seat such that the child occupant, especially infants, of the safety seat faces the rear of the vehicle. This is intended to protect the child in the event of an accident by insuring that the child will be projected toward the soft back of the child safety seat.

Child car safety seats are often constructed with side panels that can obstruct any view of a smaller child when the child is in the child safety seat. This, plus the rear facing orientation of a child safety seat, makes it very difficult for a driver to check on the condition of a rearward facing small child. If a small child is crying or otherwise giving indications of distress, the driver, if alone, is put in the position of having to stop the car in order to check on the child. This can be inconvenient at best, and dangerous at worst if there is no safe roadside location to which the driver may safely drive the vehicle. If there is another passenger in the car, the passenger must turn her/his body and lean back over the front seat. In either case, the situation is dangerous or inconvenient. If the child is quiet, it is important that the driver or passenger be able to monitor the child to ensure that nothing untoward has happened to the child.

Federal Motor Vehicle Safety Standards require that all new forward facing child safety seats meet stricter head protection requirements. To meet these requirements, most seats will have a top tether strap. Most passenger vehicles manufactured after Sep. 1, 1999 are equipped with top tether anchors. All cars, minivans, and light trucks will have these anchors beginning September, 2000. These anchors are required in three rear seating positions. Top tether anchors may be found on the rear shelf area of a vehicle. In some vehicles, such as mini vans and station wagons, the tether anchor may be found on the rear floor of the vehicle or on the back of the rear seat.

Currently, some new passenger vehicles are equipped with lower child seat anchorage points between a vehicle's seat cushion and seat back. By Sep. 1, 2002, the two lower anchorage points and top tether anchor will be required in every rear seating position of all cars, minivans, and light trucks.

SUMMARY OF THE INVENTION

Embodiments of the present invention provide a mirror which is primarily intended for positioning against the back seat of a vehicle. The mirror is adapted to being attached to various tether fasteners joined to a vehicle structure about the back seat. To soften and reduce the starkness of a mirror to a child, a fabric cover with elastic edging may be positioned over the back of the mirror. The fabric cover may have a stuffed figure attached thereto.

One specific embodiment of the present invention is a device for observing an infant in a rear facing safety seat located in the rear seat of a motor vehicle. A rear seat mirror has a front reflecting surface and a back surface. A mirror positioning structure is connected to the back surface by a v-shaped arrangement of support surfaces. A mirror attachment assembly includes at least one strap having a secured end connected to at least one of the back surface and the mirror positioning structure, and a free end having a fastener capable of connecting to a tether anchor associated with the rear seat.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Figure 1:
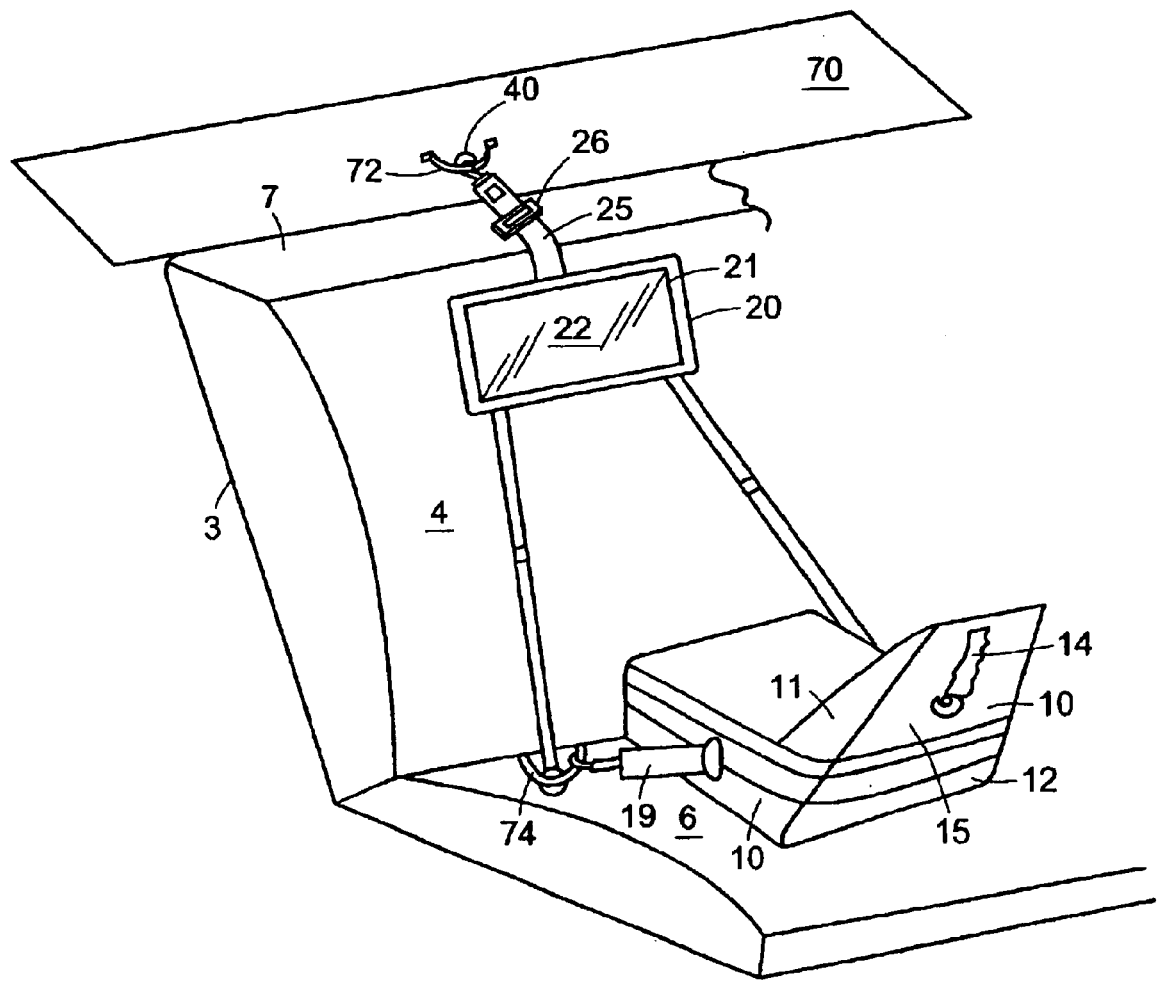
FIG. 1 is a perspective view of one embodiment of the invention attached across a vehicle back seat with a child safety seat attached.
Figure 2:
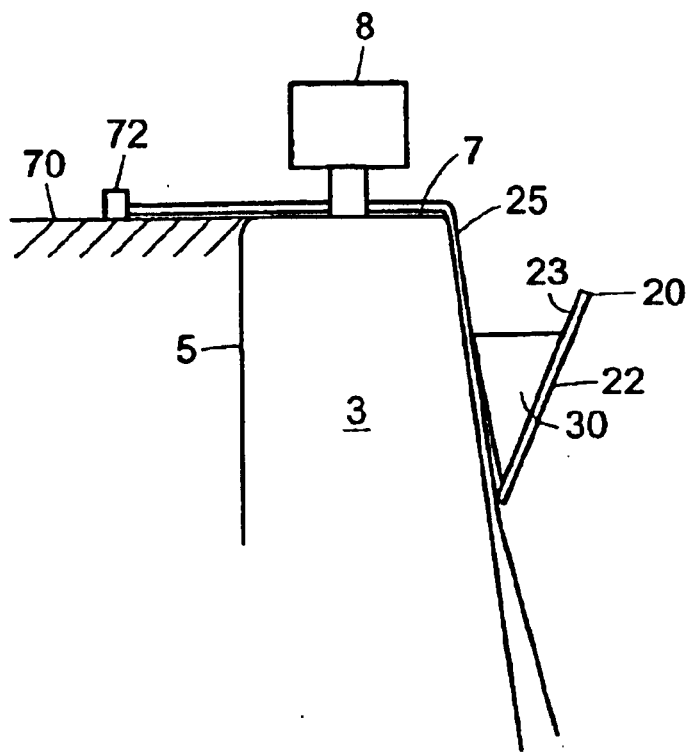
FIG. 2 is a perspective view of one embodiment of the invention attached to a sedan back shelf anchor.
Figure 3:
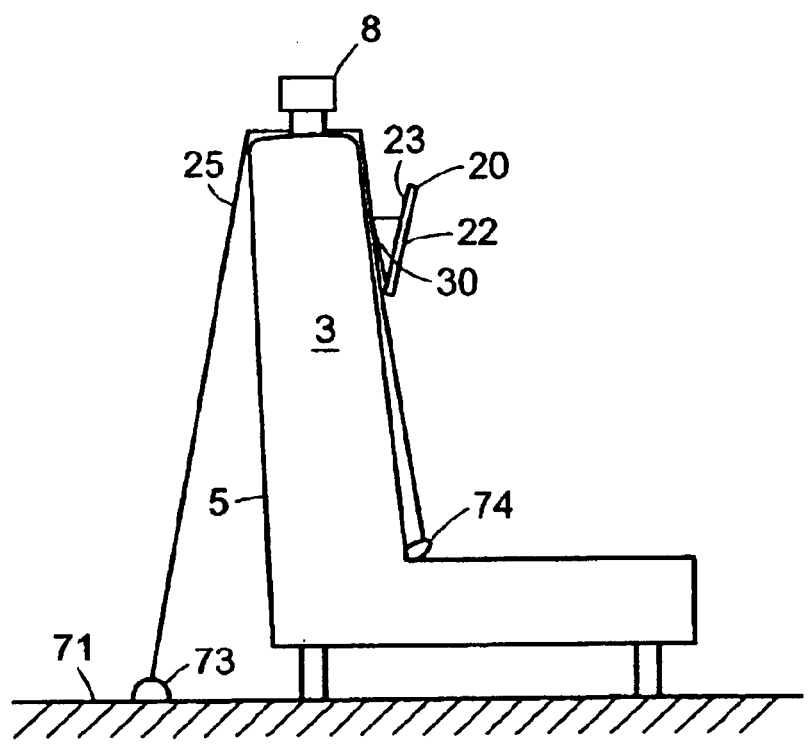
FIG. 3 is a perspective view of one embodiment of the invention attached to a station wagon/S.U.V. floor anchor.
Figure 4A:
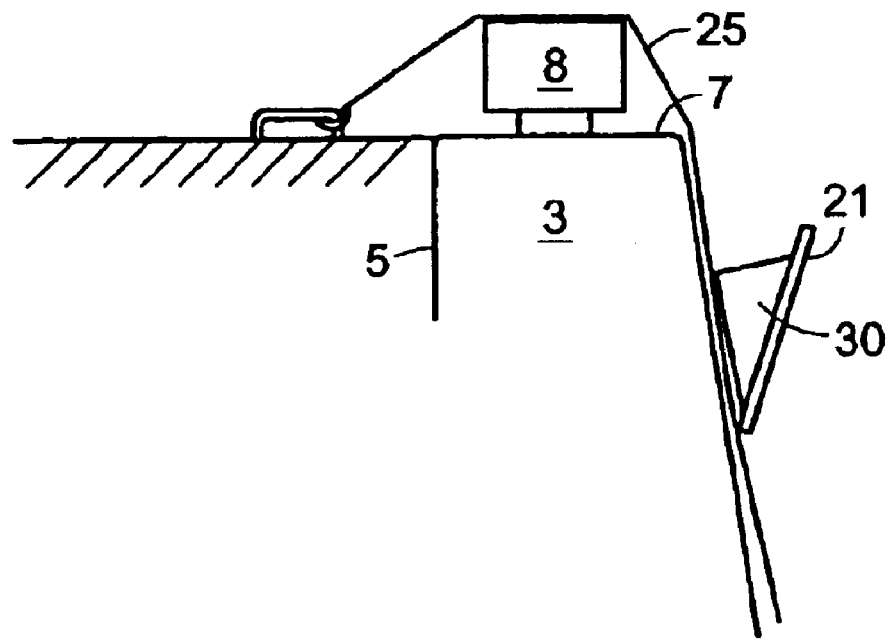
FIG. 4A is a perspective view of one embodiment of the invention fitted over a headrest.
Figure 4B:
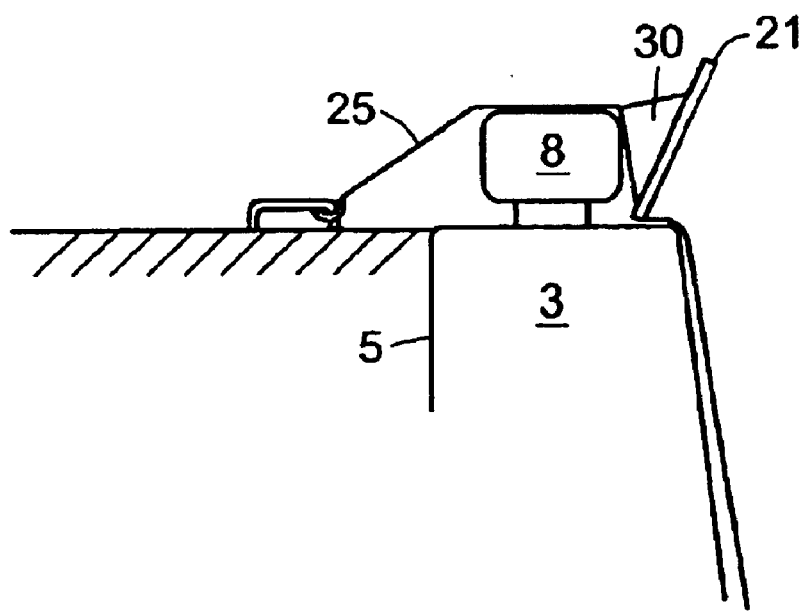
FIG. 4B is another perspective view of one embodiment of the invention fitted over a headrest.

Referring to the drawings in detail wherein like elements are indicated by like numerals, there is shown a vehicle back seat 3 behind the front seat of a motor vehicle. The back seat 3 has a back rest 4 facing a vehicle front end, an opposite rear side 5 facing a vehicle rear end, and a sitting portion 6 adjacent to the back rest 4. A top tether anchor 72 is shown on a vehicle rear shelf area 70 adjacent the back seat rear side 5. In another embodiment, a tether anchor 73 is shown attached to the vehicle rear floor 71 behind the back seat rear side 5. Two lower anchors 74 are shown installed between the back rest 4 and sitting portion 6.

The vehicle back seat 3 is shown with a child car safety seat 10 resting on the back seat sitting portion 6 and attached to the vehicle back seat by means of a car seat tether belt 19 attached to the back seat lower anchors 74. The child car safety seat 10 is positioned so that an infant placed in the child car safety seat 10 faces the back rest 4 of the vehicle back seat 3.

The child car safety seat 10 may be of an integral, single piece construction or may be a two part construction comprised of a removable car seat component 11 attached to a car seat base 12. The car seat base 12 will generally stay in place in the car attached to the vehicle rear seat 3. Most infant car safety seats 10 will also have a carrying handle attached thereto. The car safety seat 10 may have a tether strap 14 attached to its rear 15 adapted for attaching to the top tether anchor 72 or floor anchor 73.

The device 20 of one specific embodiment provides a mirror 21, having a front reflecting surface 22 and a back surface 23. The mirror 21 may be rectangular, round, or any other desired shape.

The front reflecting surface 22 may be planar or convex for a wider field of view. In one embodiment of the invention, the back surface 23 is attached to a v-shaped mirror support structure 30 having a first principal face 31 and a second principal face 32, the faces beginning from a flat, rectangular top surface 33 and meeting in a sharply acute bottom edge 34, the back surface 23 being attached to the first principal face 31.

An adjustable length, generally vertical strap 25 with a first end 27 and a second end 28 is fixedly attached to a junction 35 formed by the second principal face 32 and top surface 33 by attachment of the strap second end 28 to the junction 35. Adjustment may be accomplished by a conventional buckle 26 with a strap end 27 attached centrally to the buckle 26 and the buckle fitted over the vertical strap 25 itself. Looping the strap end 27 back to the buckle forms a lower loop 29 in the strap 25 Sliding the buckle 26 along the vertical strap 25 lengthens or shortens the effective length of the strap 25 by making the loop 29 smaller or larger. The vertical strap 25 is adapted to being attached to the vehicle back seat rear 5. One means of attachment is a fastener 40 slidably engaging the strap loop 29. The fastener 40 is adapted to engage either the top tether anchor 72 or the floor tether anchor 73 over the vehicle back seat top 7. The strap 25 may be passed under or over the back seat head rest 8. Alternatively or supplementally, the vertical strap 25 may be attached by means of fastener and pile fasteners, sold under the Velcro trademark, or by means of a "J" fastener slidably engaged to the loop 29. Fastening the vertical strap 25 to the tether anchors 72 or 73 over the vehicle back seat top 7 will cause the second principal face 32 to rest against the vehicle back seat back rest 4. This results in the attached mirror 21 presenting its reflecting front reflecting surface 22 forward toward the vehicle front. A rear facing small child in the child safety seat 10 thereby has his or her image reflected forward toward the front seat and the front seat occupant(s).

The back surface 23 also has two sections 37 of partially detachable fabric adjacent the mirror bottom corners 38. Each section is adapted to being partially pealed from the back surface 23 and folded near to the bottom corner 38. This provides a means for adjustment of either or both corners of the mirror 21 against the seat back rest 4.

Another Velcro strip 42 may be attached to the second principal face 32 near to the mirror support structure bottom edge 34 and a matching Velcro strip attached to the vehicle back seat back rest 4, the strips adapted to engage each other in a fastener relationship. This provides a stabilization means for the mirror 21 especially if a "jumbo" mirror is used.

Figure 5A:
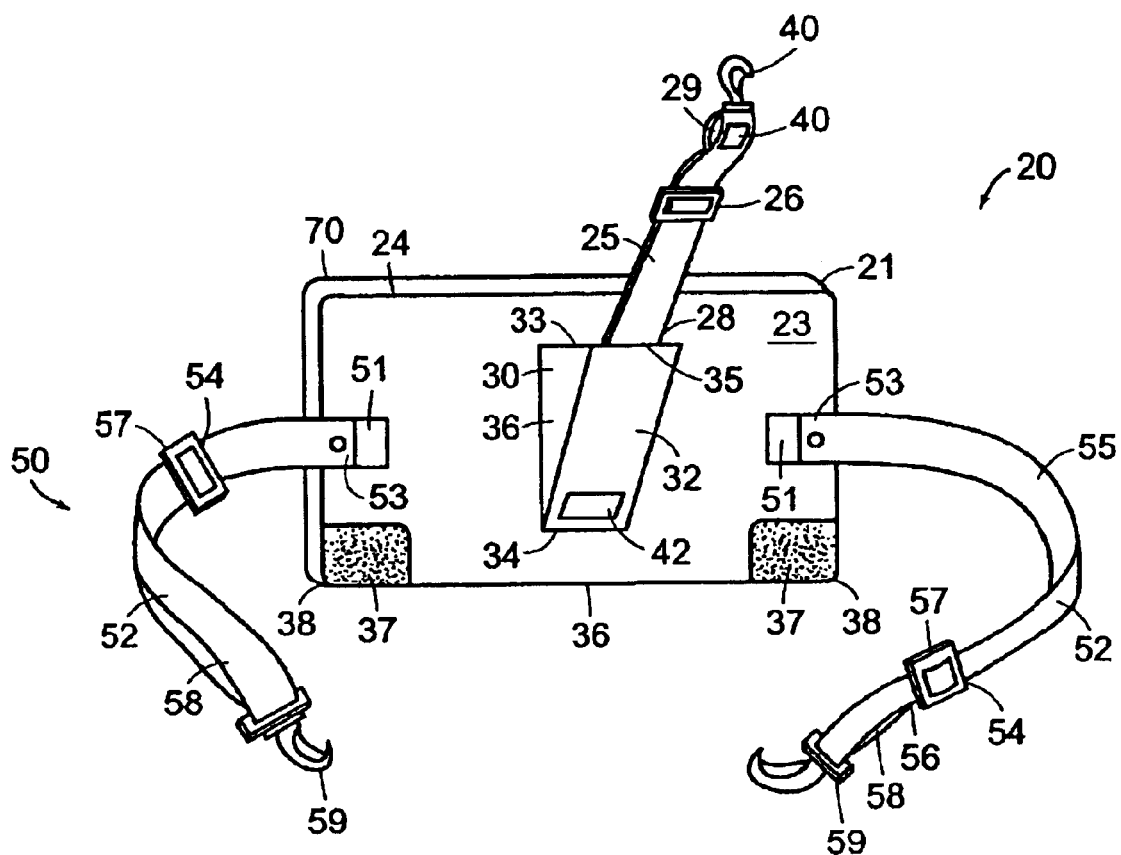
FIG. 5A is a rear view of one embodiment of the invention.
Figure 5B:
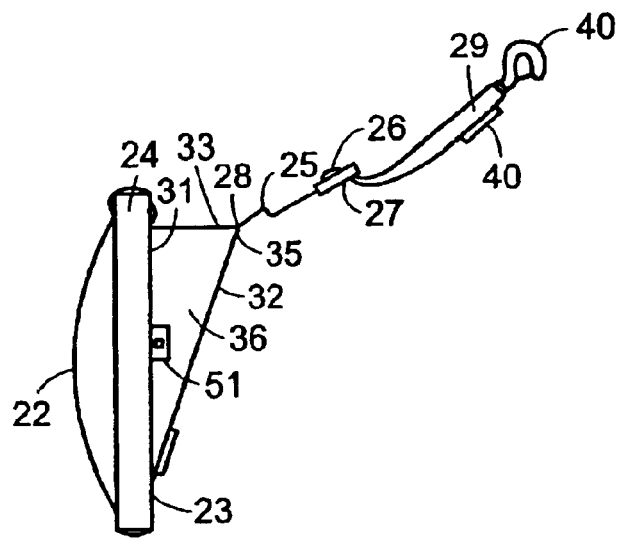
FIG. 5B is a side view of one embodiment of the invention.
Figure 6A:
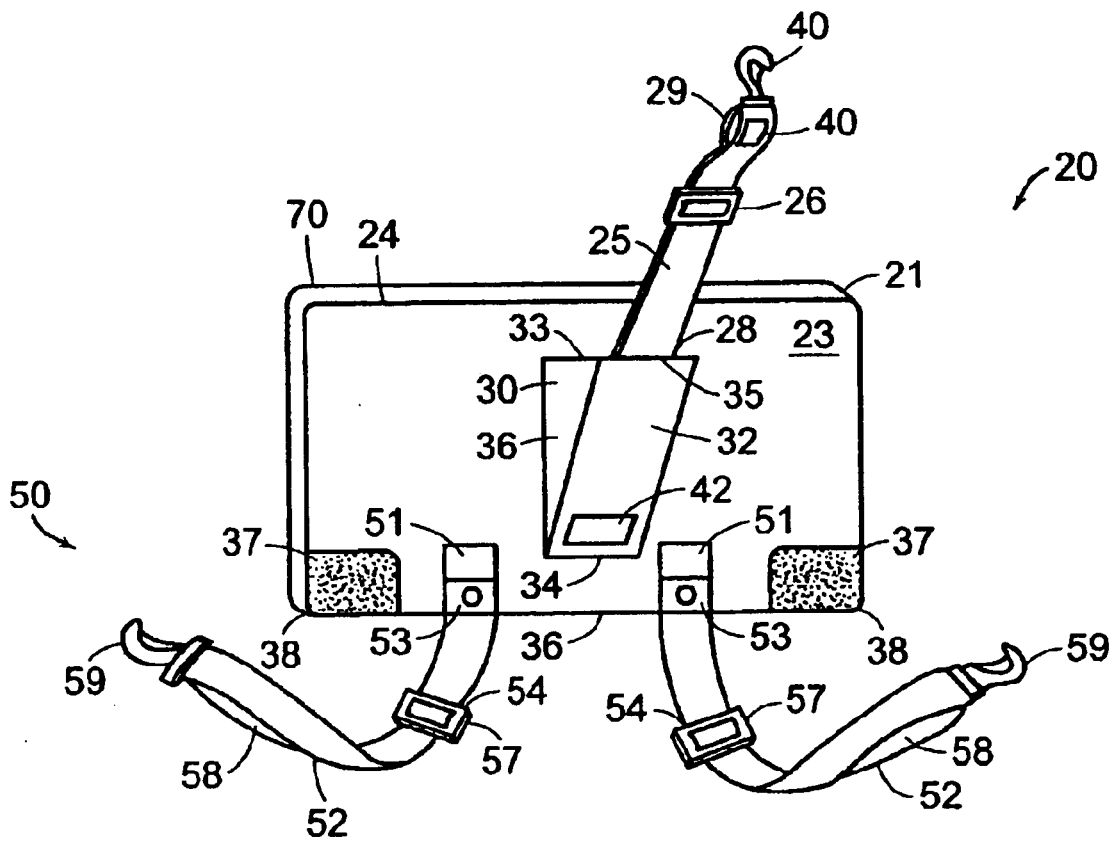
FIG. 6A is another rear view of one embodiment of the invention.
Figure 6B:
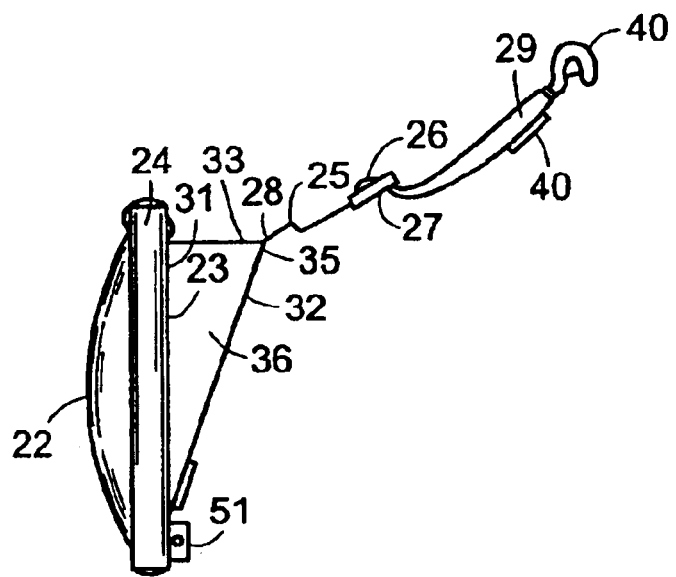
FIG. 6B is another side view of one embodiment of the invention.

The invention device is also comprised of a lower strap assembly 50, the strap assembly adapted to engage the lower anchors 74. The lower strap assembly 50 is comprised of two attachment elements 51 affixed to the back surface 23 laterally on each side 36 of the mirror support structure 30, and an adjustable strap 52 attached to each attachment element 51. See FIGS. 5A and 5B. Alternatively, each attachment element 51 may be affixed to the back surface 23 adjacent a mirror bottom 36 on each side of the mirror support structure 30. See FIGS. 6A and 6B. Each adjustable strap 52 has a first end 53 and a second end 54, the first end 53 being removably attached to an attachment element 51. The strap second end 54 is attached centrally to a conventional buckle 57, the buckle 57 fitted over the strap 52 forming an adjustable loop 58. Sliding the buckle 57 along the strap section 52 makes the loop 58 smaller or larger thereby lengthening or shortening the effective length of the strap 52. The loop 58 is adapted to engage a fastener 59, which is adapted for engagement with one of the lower anchors 74. By manipulation of the lengths of the straps 52, the mirror may be adjusted about a horizontal axis. The straps 52 could also each be comprised of an elastic bungee style cord.

A fabric cover 60 may be positioned over the mirror 21 to soften and reduce the starkness of a mirror to a child. The fabric cover 60 may have a stuffed figure attached thereto. The fabric cover 60 is shaped to just fit over the mirror 21 covering the back surface 23 and covering the edges 24 only of the front reflecting surface 22. An elastic edging 61 is formed along the perimeter of the fabric opening 62 about the mirror reflecting surface side 22 thereby holding the fabric 60 in place on the mirror 21. The fabric cover 60 may be adapted to also continuously cover all or a portion of the mirror support structure 30.

Figure 7A:
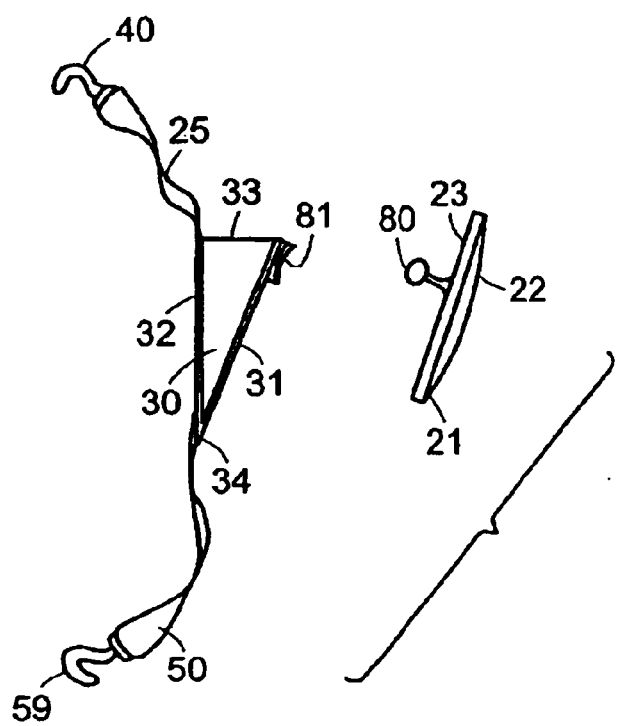
FIG. 7A is a side view of another embodiment of the invention.
Figure 7B:
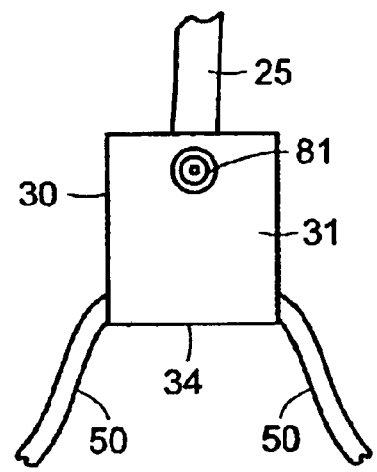
FIG. 7B is a front view of the embodiment illustrated in FIG. 7A.
Figure 8:
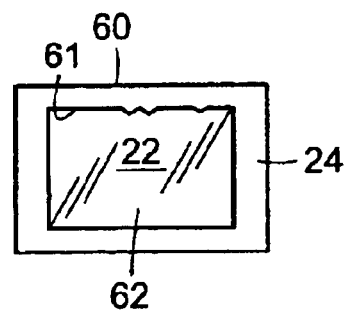
FIG. 8 is a front view of the mirror with a fabric cover.

In another embodiment of the invention as shown in FIGS. 7A and 7B, the back surface 23 has a protruding ball assembly 80 centrally attached thereto. The first principal face 31 has a round, receptacle 81 adapted to frictionally receive the protruding ball assembly 80. This arrangement permits adjustment of the mirror 21 about a vertical and horizontal axis as the invention device lays against the seat back rest 4. The lower strap assembly 50 is attached directly to the second principal face 32.

Although various exemplary embodiments of the invention have been disclosed, it should be apparent to those skilled in the art that various changes and modifications can be made which will achieve some of the advantages of the invention without departing from the true scope of the invention.

What is claimed is:

1. A combination comprising:
   a top tether anchorage point intended for attachment of the top tether of a forward facing child safety seat in a motor vehicle, and a pair of lower child seat anchorage points; and
   a device for observing an infant in a rear facing child safety seat located in the rear seat of the motor vehicle, said device in turn comprising
      a mirror assembly including a rear seat mirror having a front reflecting surface and a back surface, and a mirror positioning structure connected to said back surface,
      an upper strap for connecting said mirror assembly to said top tether anchorage point, and
      a pair of lower straps for connecting said mirror assembly to said lower child seat anchorage points.

2. The combination of claim 1, wherein said upper strap is adjustable in length.

3. The combination of claim 2, wherein said lower straps are adjustable in length.

4. The combination of claim 2, wherein said lower straps comprise elastic bungee style cords.

5. The combination of claim 1, wherein said lower straps are adjustable in length.

6. The combination of claim 1, wherein said lower straps comprise elastic bungee style cords.

7. The combination of claim 1, wherein said mirror positioning structure has a V-shaped arrangement of support surfaces connected to said back surfaces; and wherein said upper strap has a secured end connected to at least one of said back surface and said mirror positioning structure, and a free end having a fastener capable of connecting to the top tether anchorage point.

8. The combination of claim 7, wherein said upper strap is adjustable in length.

9. The combination of claim 8, wherein said lower straps are adjustable in length.

10. The combination of claim 8, wherein said lower straps comprise elastic bungee style cords.

11. The combination of claim 7, wherein said lower straps are adjustable in length.

12. The combination of claim 7, wherein said lower straps comprise elastic bungee style cords.

13. The combination of claim 1, wherein said mirror positioning structure comprises a ball, and a receptacle which frictionally receives said ball.

14. The combination of claim 13, wherein said upper strap is adjustable in length.

15. The combination of claim 14, wherein said lower straps are adjustable in length.

16. The combination of claim 14, wherein said lower straps comprise elastic bungee style cords.

17. The combination of claim 13, wherein said lower straps are adjustable in length.

18. The combination of claim 13, wherein said lower straps comprise elastic bungee style cords.

* * * * *